United States Patent [19]

Osawa et al.

[11] Patent Number: 4,544,896
[45] Date of Patent: Oct. 1, 1985

[54] AMPLITUDE ADJUSTING EQUIPMENT IN A SIGNAL TRANSLATION LINE

[75] Inventors: Michitaka Osawa; Etuo Funada; Hiroyuki Miyajima; Hitoshi Maekawa; Kunio Ando, all of Yokohama, Japan

[73] Assignee: Hitachi, Ltd., Tokyo, Japan

[21] Appl. No.: 709,848

[22] Filed: Mar. 11, 1985

Related U.S. Application Data

[63] Continuation of Ser. No. 575,780, Feb. 1, 1984, abandoned.

[30] Foreign Application Priority Data

Mar. 9, 1983 [JP] Japan .................. 58-37332

[51] Int. Cl.$^4$ .............................................. H03G 3/20
[52] U.S. Cl. .................................... 330/284; 330/279
[58] Field of Search ................ 330/86, 278, 279, 282, 330/284, 59, 144, 145, 308

[56] References Cited

U.S. PATENT DOCUMENTS 4,464,635  8/1984  Rypkema ........................... 330/284

OTHER PUBLICATIONS

W. Sansen et al., "An Integrated Wide-Band Variable-Gain Amplifier with Maximum Dynamic Range" IEEE Journal of Solid-State Circuit, Aug. 1974.

Primary Examiner—James B. Mullins
Assistant Examiner—G. Wan
Attorney, Agent, or Firm—Antonelli, Terry & Wands

[57] ABSTRACT

An amplitude-adjusting circuit used for a contrast-adjusting circuit of resistor division type in which a video signal is applied across a pair of series-connected resistors and an output is produced from the junction point of the two resistors. At least one of the resistors is used as a variable resistor. The amplitude-adjusting circuit comprises a current source for supplying a constant current steadily between the terminals of the variable resistor, a high-gain amplifier for controlling the resistance value of the variable resistor, and a filter for separating the video signal component from the change of the value of the variable resistor represented by a voltage change, and introducing the resistance change to the high-gain differential amplifier.

9 Claims, 5 Drawing Figures

AMPLITUDE ADJUSTING EQUIPMENT IN A SIGNAL TRANSLATION LINE

This application is a continuation, of application Ser. No. 575,780, filed Feb. 1, 1984 now abandoned.

The present invention relates to an amplitude-adjusting apparatus suitable for uniformly adjusting the contrasts of the primary colors in a display unit provided with independent wide-band transmission lines for red, green and blue primary color signals.

The DC control variable-gain amplifier disclosed in the article entitled "An Integrated Wide-Band Variable-Gain Amplifier with Maximum Dynamic Range", by Willy M.C. Sansen, et al., IEEE Journal of Solid-State Circuits Vol.SC-9, No. 4, August 1974, is an example of the contrast-adjusting apparatus for the display unit used with a computer terminal. On the other hand, a contrast-adjusting circuit for a high-fidelity monitor circuit, a high-definition TV circuit with a bandwidth as large as 30 MHz, or a high-resolution color display terminal circuit with a bandwidth of as large as 100 MHz has the disadvantages (1) to (5) mentioned below, of which only the disadvantage (2) is solved by the above-quoted circuit.

(1) The linearity (differentiation gain) is low:

Although the linearity may be improved to some degree by considerable negative feedback, the problems of a deteriorated stability and the difficulty of improving the linearity of a gain control transistor remain unsolved. When the linearity is deteriorated, the amplification factors for signals of small and large levels are different each other, thus making a faithful signal reproduction impossible.

(2) The punch-through phenomenon of high-frequency signal occurs:

This phenomenon is primarily attributable to the coupling capacitor between the electrodes of the gain control transistor and requires a great improvement of the element structure. When this problem occurs, on the other hand, the signal waveform is attenuated according to the control voltage only on low-frequency side, while the signal is produced unattenuated on high-frequency side, so that only the high-frequency component is emphasized. (This effect is especially conspicuous when a large signal attenuator is used.)

(3) The distortion characteristics of high harmonics are inferior:

(4) The S/N ratio is low:

These disadvantages are unavoidable with an amplifier, and not sufficiently obviated in spite of the effort to reduce them by such means as a reduced number of the component semiconductor elements or an increased amount of negative feedback.

(5) A multiplicity of circuits in parallel juxtaposition has a large interlocking error:

This poses a very important problem in the color video signal. In the case where three-channel signal circuits of red, green and blue are controlled by a single control system and the attenuation circuits thereof have a variation, for instance, the white balance is broken making it impossible to reproduce the tone correctly. Further, in the case where the frequency characteristics are varied between the attenuation elements of the channels, the tone is further adversely affected on low-frequency and high-frequency sides of the signal components with the result that the functions of the attenuators are finally lost.

The only method of reducing the variations between the channels with the circuit disclosed in the literature quoted above is to reduce the variations between the elements making up each circuit. Therefore, this disadvantage is a great problem for a color display unit including a plurality of interlocking gain control amplifiers for a plurality of channels.

The object of the present invention is to provide an amplitude-adjusting apparatus with a small gain variation, which obviates the above-mentioned disadvantages, thereby maintaining a wide-band frequency characteristic without regard to gain variation.

According to the present invention, in order to attain the object, there is provided an amplitude-adjusting apparatus comprising a pair of a first resistor and a second variable resistor in series with a signal source, output means for producing a signal source voltage divided by the series circuit of resistors, and control means including a pair of input terminals, the first input terminal being supplied with a voltage drop caused by a DC current flowing through the second resistor, the second input terminal being connected to a variable voltage source for adjusting the resistance value of the second resistor, the control means controlling the resistance value of the second resistor in a manner to depress the voltage between the input terminals, whereby the output means is able to produce an output voltage according to the voltage of the variable voltage source even when the resistance value of the second resistor is varied.

The present invention will be apparent from the following detailed description taken in conjunction accompanying drawings, in which.

Figure 1:
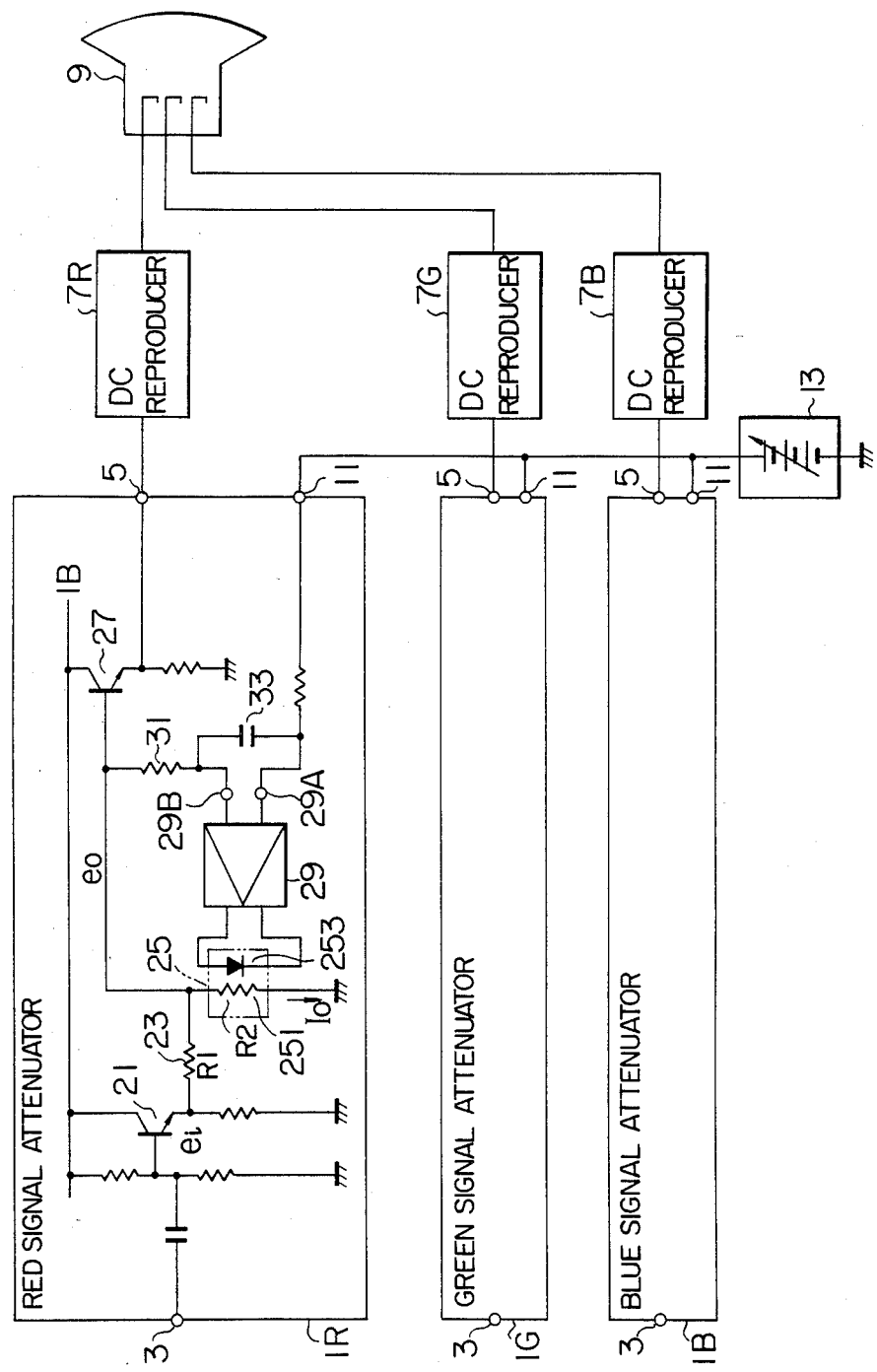
FIG. 1 is a circuit diagram showing an embodiment of the present invention.

A circuit according to an embodiment of the present invention is illustrated in FIG. 1, in which an amplitude-adjusting apparatus is used for a contrast-adjusting circuit of an R.G.B monitor. This contrast-adjusting circuit may of course be used for a display unit of brightness-color difference separation type. In FIG. 1, characters 1R, 1G, 1B designate signal attenuators having an internal circuit and operated as an amplitude-adjusting apparatus, in which input terminals 3 are supplied with the primary color signals of red, green and blue to produce at output terminals 5 the primary color signals equally attenuated respectively. The primary color signals produced at the output terminals 5 are reproduced in DC fashion by DC reproducers 7R, 7G, 7B and applied to the respective cathodes of a color picture tube 9 respectively.

The amount of attenuation of each signal is controlled in accordance with a variable DC voltage source 13 connected to the control terminal 11 of each of the signal attenuators 1R, 1G, 1B. The DC voltage supplied to each control terminal 11 (which may be an AC voltage for brightness modulation) is independent of the primary colors, and therefore, the place of installation of the voltage source 13 or the wiring arrangement for the voltage source 13 may be determined freely.

Each primary color signal applied to each input terminal 3 is produced as an AC signal $e_i$ at the emitter of a transistor 21, and after being divided by a resistor 23 and a secondary resistor 251 of a photocoupler 25, the divided signal voltage $e_0$ is applied to the output terminal 5 through a transistor 27. The voltage $e_0$ is given as $$e_0 = R_2/(R_1+R_2)e_i$$

where $R_1$ is the resistance value of the resistor 23, and $R_2$ the resistance value of the secondary resistor 251. If one of the resistance values $R_1$ and $R_2$ is made variable, the output signal voltage may be set freely. According to the embodiment under consideration, the resistor 251 is made variable, or alternatively, the resistor 23 may be made variable with equal effect. The description that follows concerns the case in which the resistor 251 is made variable. The resistance value $R_2$ is controlled by the current value (the primary current) flowing in a light-emitting diode 253 of the photocoupler 25. Since the diode 253 is connected to the output terminal of a high gain differential amplifier 29, the current flowing in the diode 253 is determined by the voltage of a control terminal, namely, the input voltage of the terminal 29A of the amplifier 29, so that the resistance value $R_2$ of the secondary resistor 251 is also dependent on the voltage of the control terminal 11. This configuration permits complete separation of a signal attenuation amount control section and a signal transmission system, with the result that the freedom of the position of installing the control section is extremely increased on the one hand, and the elimination of the requirement of a lengthy signal line reduces the signal deterioration to a negligible degree on the other hand.

Now, explanation will be made about the fact that the signal attenuation for a plurality of channels is attained in balanced way according to the present invention.

In order to correct the variation of attenuation between the channels, it is necessary to detect the amount of variations. A DC current $I_O$ for detecting the resistance value as a voltage is kept flowing in the resistor 251, and therefore the DC voltage corresponding to the resistance value $R_2$ of the resistor 251 is applied to the input terminal 29B of the differential amplifier 29 through a resistor 31. The differential amplifier 29 controls the current flowing in the diode 253 (that is, the resistance value $R_2$ of the resistor 251) in a manner to reduce the voltage difference between the input terminals 29A and 29B to zero, so that the resistance value 251 takes a value corresponding to the DC voltage of the input terminal 255A in spite of a possible variation of the photocoupler 25. A capacitor 33 is provided for supplying an AC portion $e_0$ also to the input terminal 29A as well as to the input terminal 29B together with the DC portion thereby to prevent any error voltage from being generated by the AC portion. In place of the resistor 31 and the capacitor 33, a low-pass filter for removing the video signal component may be inserted between the base of the transistor 27 and the input terminal 29B. In this way, the variations of the photo-coupler 25 for respective channels are corrected by supplying the same DC voltage to the input terminal 29A of each high gain differential amplifier 29 provided for each channel, thereby making it possible to regulate the amount of attenuation of a plurality of channels by means of a single control voltage.

A satisfactory performance of the photocoupler 25, of which the secondary resistor 251 is required to have a sufficiently small distributed capacity, is obtained by an ordinary photocoupler using CdS. Nevertheless, any type of photocoupler may be used to the extent that the resistor 251 has such a small distributed capacity that any signal is not superimposed on the control block for controlling the value of the resistor 251.

The embodiment shown in FIG. 1, which overcomes all the disadvantages of item (5) above, does not use any element which exhibits a non-linear characteristic against the video signal voltage in the signal system thereof, and therefore superior frequency, amplitude and phase characteristics as well as distortion characteristic are obtained, thus facilitating the flattening of characteristics.

Figure 2:
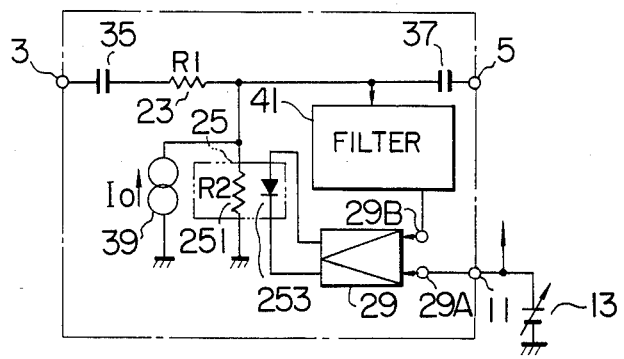
FIGS. 2 to 5 are circuit diagrams showing other embodiments of the present invention.

FIG. 2 shows a circuit of a signal attenuator according to another embodiment. A resistor 23 is separated in DC fashion from input and output terminals 3 and 5 by capacitors 35 and 37 respectively; a current source 39 is connected in parallel to a secondary resistor 251; and a filter 41 is inserted between the junction point of resistors 23 and 251 and an input terminal 29B of a high-gain differential amplifier 29.

Figure 3:
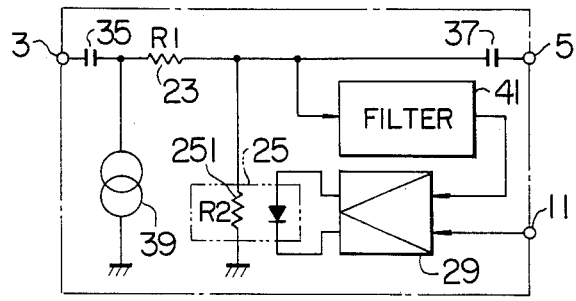

In FIG. 3, the position of insertion of the detection current source 39 is transferred to the input side as compared with the circuit of FIG. 2. The circuit configuration of FIG. 3 eliminates the problem of the reduced cut-off frequency which otherwise might be caused by a low-pass filter comprised of the distributed capacity of the detection current source 39 and the resistor 23, thus permitting an increased bandwidth.

Figure 4:
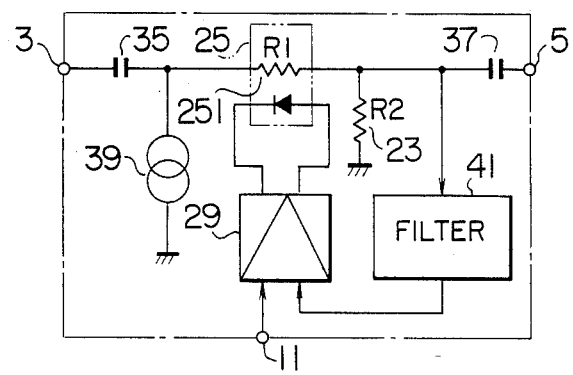

FIG. 4 shows a circuit in which the constitution of the resistors 23 and 251 in FIG. 3 is changed.

Figure 5:
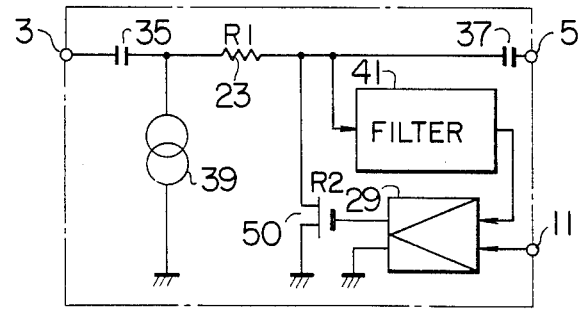

In FIG. 5, the photocoupler 25 is replaced by an FET (which may be substituted for by an bipolar transistor) with equal effect.

We claim:

1. An amplitude-adjusting apparatus comprising a signal input terminal supplied with a signal, a control terminal supplied with a control voltage, a signal output terminal for producing an amplitude-set signal in accordance with the control voltage, signal divider means including first and second impedance elements for dividing the signal applied to said input terminal, signal transmission means for introducing the input signal divided by the signal divider means to said signal output terminal, DC current supply means for supplying a DC current to at least one of the first and second impedance elements, and control means including a first input terminal connected to said control terminal and a second input terminal supplied with the DC voltage generated across one of the impedance elements for controlling the impedance value of one of said impedance elements in such a manner as to depress the voltage difference between the first and second input terminals.

2. An amplitude-adjusting apparatus according to claim 1, wherein said control means comprises a high-gain differential amplifier.

3. An amplitude-adjusting apparatus according to claim 2, wherein one of said impedance elements of said signal divider means is a variable resistor having a resistance value changing with the output of said control means, while the other impedance element is a fixed resistor.

4. An amplitude-adjusting apparatus according to claim 3, wherein said variable resistor is the secondary resistor of a photocoupler, and said control means includes a light-emitting means for emitting light of an amount changing with the output of said high-gain differential amplifier.

5. An amplitude-adjusting apparatus according to claim 3, wherein said variable resistor comprises a transistor.

6. An amplitude-adjusting apparatus comprising:
(a) a signal source;

(b) first and second resistors connected in series with said signal source;
(c) resistance value control means for changing the resistance value of said second resistor in accordance with a DC control signal;
(d) differential amplifier means including first and second input terminals for generating a DC control signal corresponding to the voltage between the input terminals;
(e) a variable DC voltage source connected to the first input terminal of said differential amplifier means;
(f) current supply means for supplying a DC current to said second resistor;
(g) DC voltage supply means for supplying the second input terminal of said differential amplifier means with the DC voltage generated across said second resistor; and
(h) output means for producing an AC signal generated across one of said first and second resistors.

7. An amplitude-adjusting apparatus for a plurality of signal transmitters each comprising a signal input terminal supplied with a signal, a signal output terminal for producing an amplitude-adjusted signal, signal divider means including first and second impedance elements for dividing said signal applied to said input terminal, signal transmission means for introducing said input terminal signal divided by said signal divider means to said signal output terminal, DC current supply means for supplying a DC current to at least one of the first and second impedance elements, and control means including a first input terminal supplied with a control voltage and a second input terminal supplied with the DC voltage generated across one of the impedance elements for controlling the impedance value of one of said impedance elements in such a manner as to depress the voltage difference between the first and second input terminals, said apparatus comprising variable DC voltage means for supplying same variable DC voltage to said first input terminals of control means of all signal transmitters.

8. An amplitude-adjusting apparatus according to claim 7, wherein said control means comprises a high-gain differential amplifier.

9. An amplitude-adjusting apparatus comprising:
(a) a signal source;
(b) first and second impedance elements connected in series with said signal source;
(c) impedance value control means of changing the impedance value of said second impedance element in accordance with a DC control signal;
(d) differential amplifier means including first and second input terminals for generating a DC control signal corresponding to the voltage between the input terminals;
(e) a variable DC voltage source connected to the first input terminal of said differential amplifier means;
(f) current supply means for supplying a DC current to said second impedance element;
(g) DC voltage supply means for supplying the second input terminal of said differential amplifier means with the DC voltage generated across said second impedance element;
(h) output means for producing an AC signal generated across one of said first and second resistors; and (i) capactive means connected between said first and second input terminals of said differential amplifier for causing said differential amplifier to be insensitive to a high frequency component of a differential voltage produced between said first and second input terminals.

* * * * *